Patented May 16, 1939

2,158,525

UNITED STATES PATENT OFFICE 2,158,525

PRODUCTION OF HYDROGEN PEROXIDE

Hans-Joachim Riedl and Georg Pfleiderer, Ludwigshafen-on-the-Rhine, Germany, assignors to I. G. Farbenindustrie Aktiengesellschaft, Frankfort-on-the-Main, Germany No Drawing. Application October 3, 1936, Serial No. 103,852. In Germany October 10, 1935

11 Claims. (Cl. 23—207)

This invention relates to the production of hydrogen peroxide by oxidizing organic compounds of a distinct nature with oxygen.

It is already known that hydrogen peroxide is formed by the oxidation of many organic compounds which have hydrogen atoms which are comparatively readily split off with oxygen. It has hitherto been thought that this oxidation only proceeds rapidly when the solution contains such an amount of alkali or alkaline earth that the hydrogen perioxide formed is completely bound thereto. By this method, metal peroxides are thus first obtained and the free hydrogen peroxide must be prepared from the said peroxides in a further stage of the process. It is known that free hydrogen peroxide is formed by autoxidation in a non-alkaline medium, but under normal conditions in the cases hitherto known the speed of oxidation has been so small that side reactions come into prominence and the yield of hydrogen peroxide is extremely bad. In order to overcome this drawback it has been proposed in experiments with hydrazobenzene to carry out the autoxidation in a neutral medium under a high pressure of oxygen and to employ a medium in which the hydrogen peroxide is insoluble so that it separates during the oxidation.

We have now found that contrary to expectation a certain kind of substances may be oxidized rapidly, readily and smoothly with elementary oxygen or gases containing the same, in a neutral medium or if desired in a slightly acid or slightly alkaline medium, with the simultaneous, practically quantitative formation of hydrogen peroxide. Substances of the said kind are cyclic in particular polynuclear organic compounds which are converted by the autoxidation into quinoid compounds. For example substituted polynuclear hydroquinones which by autoxidation form quinones or molecule compounds of the nature of quinhydrone, such as anthrahydroquinone, methyl-, ethyl-, propyl- and isopropyl-anthrahydroquinones, chlor- or hydroxy-anthrahydroquinones, phenanthrene-, chrysene- and retene-hydroquinones, the hydrogenation products of the said hydroquinones, such as tetrahydro-anthrahydroquinones, indigo white and its substitution products, and also the corresponding quinhydrone-like molecule compounds are suitable; the latter are suitable either as initial materials or as final products. In the claims the term "hydroquinone" includes the free hydroquinones and the quinhydrone-like molecule compounds with the corresponding quinones. The substituted hydroquinones and quinones are distinguished before the others by more favorable solubility behaviour. Several substances of the before mentioned kind may be used together in one solution.

It is not essential for the autoxidisable substance to be dissolved in its entirety; it may also be suspended in part. The autoxidation may take place at ordinary or increased pressure and at ordinary or elevated temperature.

The separation of the hydrogen peroxide formed by the action of the oxygen may be effected in different ways. For example the process may be carried out in solvents for the raw materials in which hydrogen peroxide is insoluble and separates as such, as for example in benzene, toluene, xylene or tertrahydronaphthalene. This method of working is mainly of advantage when the hydrogen peroxide is to be obtained in the most concentrated form possible.

When moderate concentrations of hydrogen peroxide are sufficient, it is preferable to extract the hydrogen peroxide formed with a solvent, as for example water, which is not miscible or only miscible to a limited extent with the organic solution, during or after the oxidation. In this case, especially when the extraction takes place after the oxidation is completed, there may be selected as the solvent for the preparation of the organic solution a liquid which is not miscible with water and in which the hydrogen peroxide is soluble, as for example amyl alcohol, cyclohexanol, methylcyclohexanol and mixtures of the same with other solvents, such as benzene or xylene. The separation of the hydrogen peroxide may also be effected by distillation or freezing instead of by extraction.

The quinoid or indigoid compounds formed by the autoxidation may be reconverted by reduction in known manner into the corresponding initial materials so that by means of a given amount of autoxidisable substance practically any desired amount of hydrogen peroxide may be prepared in a cyclic process.

The following examples will further illustrate the nature of this invention but the invention is not restricted to these examples.

Example 1

6 grams of 2-methylanthraquinone are dissolved in 100 cubic centimeters of benzene and 50 cubic centimeters of cyclohexanol and reduced by molecular hydrogen to 2-methylanthrahydroquinone at room temperature and at atmospheric pressure with the aid of a nickel catalyst. The solution is freed from nickel by filtration and shaken with oxygen at atmospheric pressure, in the course of about 1 minute 600 cubic centimeters of oxygen being absorbed. After the oxidation, the hydrogen peroxide is washed out from the solution with water. About 0.8 gram of hydrogen peroxide passes into the water, i. e. more than 90 percent of the theoretical amount calculated or $O_2$. After separating the aqueous layer, the quinone solution may be again subjected to reduction.

*Example 2*

10 grams of tetrahydro-2-ethylanthraquinone prepared by hydrogenating 2-ethylanthraquinone in organic solution and in the presence of a highly active nickel catalyst with free hydrogen at normal temperature and pressure until the 2-ethylanthraquinone is practically completely converted into a tetrahydro-2-ethylanthrahydroquinone, removing the catalyst, then oxidizing the solution with free oxygen and removing the hydrogen peroxide formed by this oxidation by washing with water and then removing the solvent by distillation, are dissolved in 100 cubic centimeters of a mixture of anisol and isoheptyl alcohol (ratio 1:1) and the solution is shaken with hydrogen in the presence of a nickel catalyst until 900 cubic centimeters of hydrogen have been absorbed. After filtration, the solution having a brown shade due to the corresponding quinhydrone contained therein, is shaken with oxygen, this being absorbed in an amount of about 830 cubic centimeters, of which about 95 per cent are converted into hydrogen peroxide. The hydrogen peroxide is removed from the solution by washing with water and the solution is employed for a new reaction.

*Example 3*

100 cubic centimeters of a solution of each 5 grams of 2-methylanthraquinone, 2-ethylanthraquinone (prepared as described in Example 2) and tetrahydro-2-ethylanthraquinone in a mixture of 50 cubic centimeters of anisol and 50 cubic centimeters of isoheptyl alcohol are laden with 1100 cubic centimeters of hydrogen in the manner analogous to that of Example 3. The solution is then oxidized with oxygen, 1000 cubic centimeters of oxygen being absorbed which are recovered from the solution in the form of hydrogen peroxide with almost a quantitative yield. After removing the hydrogen peroxide by means of water the solution can anew be hydrogenated.

What we claim is:

1. The process of producing hydrogen peroxide which comprises oxidizing a disolved alkylated anthrahydroquinone with oxygen and then separating the hydrogen peroxide formed.

2. The process of producing hydrogen peroxide which comprises oxidizing a dissolved alkylated polynuclear hydroquinone selected from the group consisting of the alkylated anthrahydroquinones, the alkylated phenanthrenehydroquinones and their respective nuclear hydrogenation products with oxygen and then separating the hydrogen peroxide formed.

3. The process of producing hydrogen peroxide which comprises oxidizing a dissolved alkylated anthrahydroquinone, the alkyl group containing not more than two C-atoms, with oxygen and then separating the hydrogen peroxide formed.

4. The process of producing hydrogen peroxide which comprises oxidizing a dissolved 2-alkylated anthrahydroquinone, the alkyl group containing not more than two C-atoms, with oxygen, and then separating the hydrogen peroxide formed.

5. The process of producing hydrogen peroxide which comprises oxidizing a dissolved alkylated anthrahydroquinone hydrogenated in the nucleus, with oxygen and then separating the hydrogen peroxide formed.

6. The process of producing hydrogen peroxide which comprises oxidizing a dissolved alkylated anthrahydroquinone hydrogenated in the nucleus, the alkyl group containing not more than two C-atoms, with oxygen and then separating the hydrogen peroxide formed.

7. The process of producing hydrogen peroxide which comprises oxidizing a dissolved 2-alkylated anthrahydroquinone hydrogenated in the nucleus, the alkyl group containing not more than two C-atoms, with oxygen and then separating the hydrogen peroxide formed.

8. The process of producing hydrogen peroxide which comprises oxidizing a dissolved tetrahydro-2-alkylanthrahydroquinone, the alkyl group containing not more than two C-atoms, with oxygen and then separating the hydrogen peroxide formed.

9. The process of producing hydrogen peroxide which comprises oxidizing a dissolved alkylated phenanthrenehydroquinone with oxygen and then separating the hydrogen peroxide formed.

10. The process of producing hydrogen peroxide which comprises oxidizing a dissolved retenehydroquinone with oxygen and then separating the hydrogen peroxide formed.

11. The process of producing hydrogen peroxide which comprises oxidizing dissolved tetrahydro-2-ethylanthrahydroquinone with oxygen and then separating the hydrogen peroxide formed.

HANS-JOACHIM RIEDL.
GEORG PFLEIDERER.